United States Patent [19]

Rantala

[11] Patent Number: 4,511,847
[45] Date of Patent: Apr. 16, 1985

[54] FILTER ASSEMBLY FOR ELIMINATING MAINS DISTURBANCES

[75] Inventor: Börje Rantala, Helsinki, Finland

[73] Assignee: Instrumentarium Oy, Finland

[21] Appl. No.: 389,278

[22] Filed: Jun. 17, 1982

[30] Foreign Application Priority Data

Jun. 22, 1981 [FI] Finland .................................. 811941

[51] Int. Cl.³ .............................................. H03B 1/04
[52] U.S. Cl. ..................................... 328/167; 307/520; 307/522; 307/352; 307/529
[58] Field of Search ............... 307/520, 522, 524, 352, 307/529; 328/167

[56] References Cited

U.S. PATENT DOCUMENTS 4,017,812  4/1977  Bonnefoy-Claudet et al. .... 307/520

Primary Examiner—John S. Heyman
Attorney, Agent, or Firm—Andrus, Sceales, Starke & Sawall

[57] ABSTRACT

The invention relates to a filter assembly for eliminating mains disturbances from an electric signal, especially noise type of bioelectric signal, for analyzing the signal characterizing quantities, particularly amplitude or intensity. The invention includes a sample and hold circuit for providing analogous discrete time signals from the signal to be analyzed by employing doubled mains frequency as a sampling frequency, a summer for providing signals $Y_n = \frac{1}{2}(X_n + X_{n-1})$, wherein $X_n$ is a number n sample, from successive analogous samples for filtering away the mains frequency and its odd harmonic frequencies, as well as a high-pass filter for said signals $Y_n$ for filtering away the even harmonic frequencies of mains frequency.

2 Claims, 4 Drawing Figures

FILTER ASSEMBLY FOR ELIMINATING MAINS DISTURBANCES

BACKGROUND OF THE INVENTION

For the elimination of the basic frequency of a mains disturbance it is generally known in the art to sum up successive samples picked up from a signal to be analyzed. The elimination of mains disturbances is generally effected by using digital filters which, however, can be of quite a complicated design and thus expensive, particularly depending on how much signal information is desired to be analyzed from the filtered signals. In certain special applications, for example when the signals to be analyzed are a kind of noise signals such as several bioelectrical signals like EEG and EMG, the only interesting quantity to be analyzed may be the amplitude of a signal, the above-mentioned digital filters often being unnecessarily complicated for the purpose.

An object of the invention is to provide a simple design and economic filter assembly for effectively filtering out all mains disturbances which is especially suitable for use when the only signal parameter of interest is amplitude or power. Other signal features, such as waveform or phase, are destroyed in the filtering process.

DESCRIPTION OF THE DRAWINGS

The invention will now be further described with reference to the accompanying drawing in which.

DESCRIPTION OF THE ILLUSTRATED EMBODIMENT

Figure 1:
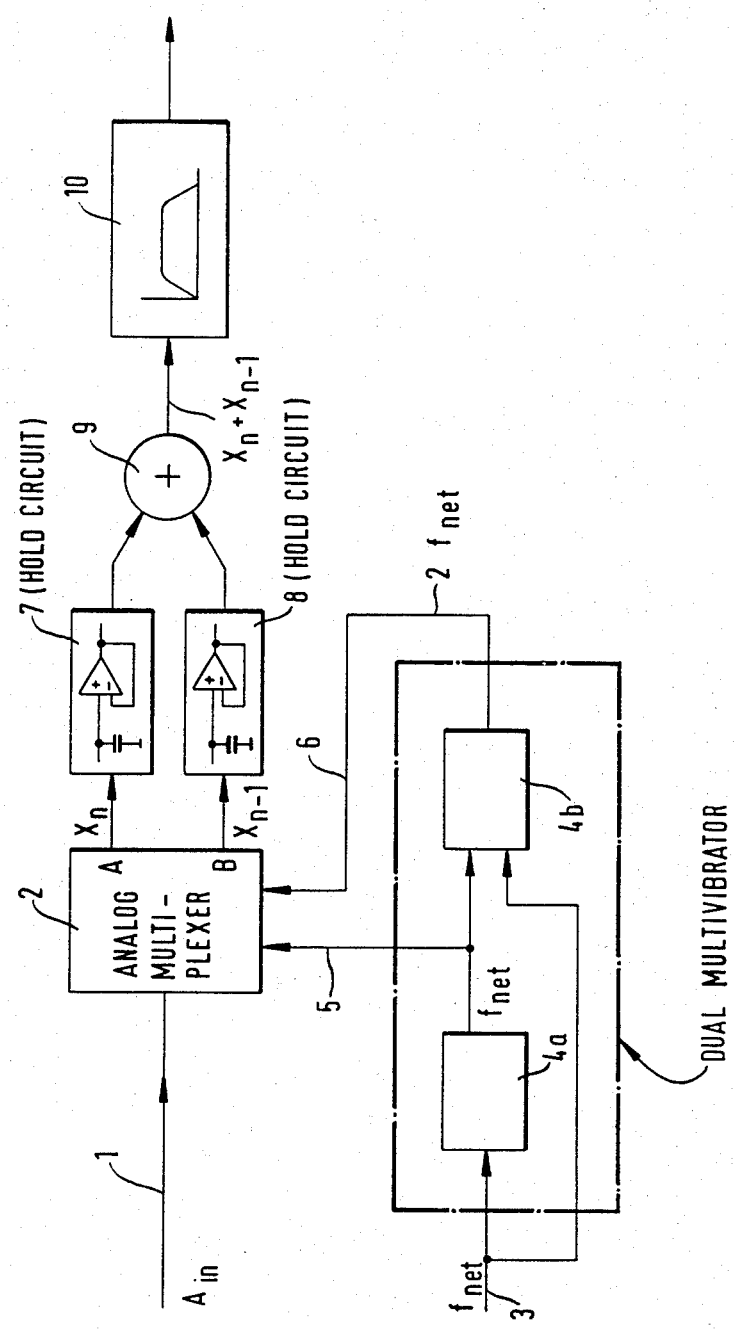
FIG. 1 is a diagrammatic view of a filter assembly according to the invention.

The operation of a filter assembly illustrated in FIG. 1 is the following. After a possible amplification and band determination, a signal 1 to be analyzed is fed to an analog multiplexer 2. A reference signal 3, a square wave, at the mains frequency is passed into a frequency doubling circuit which in the figure is made up by a dual-multivibrator $4a$-$4b$. Signal 5 is used for the selection of a channel (A or B) and signal 6, which represents the doubled mains frequency, is used to provide analogous discrete time samples from the signal to be analyzed. Said samples are passed through hold circuits 7 and 8 into a summing circuit 9 for producing signals $$Y_n = \tfrac{1}{2}(X_n + X_{n-1}), \tag{1}$$

wherein $X_n$ is a number n sample.

Obtained by conventional Z-conversion is $$Y(Z) = 1 + Z^{-1}, \tag{2}$$

whereby a disposition $Z = e^{jw}$, w frequency variable, leads to the transfer function of this stage $$/H(w)/^2 = \tfrac{1}{2}(1 + \cos w). \tag{3}$$

Figure 2:
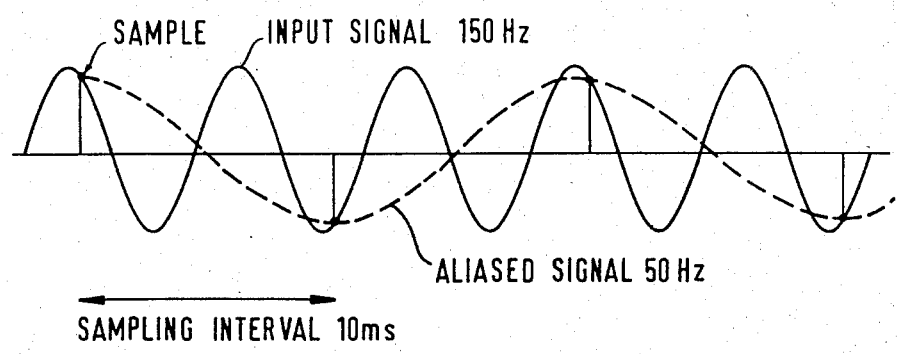
FIG. 2 is a schematic view of signal aliasing inherent to a filter assembly of the invention.

Thus, the transfer function, wherein $H(w) = A$ (out)/A (in), is a periodic function with zero points at frequencies $w = \pi, 3\pi, 5\pi \ldots$ (rad/s); at a sampling frequency 100 Hz the zero points are set on frequencies 50, 150, 250 Hz . . . . In addition to this, signal $X_n + X_{n-1}$ is aliased on frequencies 0–50 Hz. FIG. 2 shows an example of aliasing: after the aliasing, a 150 Hz signal looks like 50 Hz, even so that $X_n + X_{n-1}$ is always zero.

Figure 3:
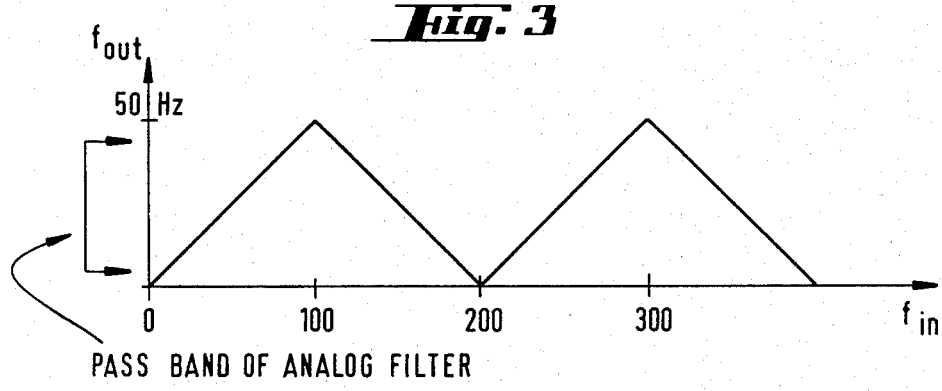
FIG. 3 shows schematically filtering of the output signal of an aliasing sampling circuit.
Figure 4:
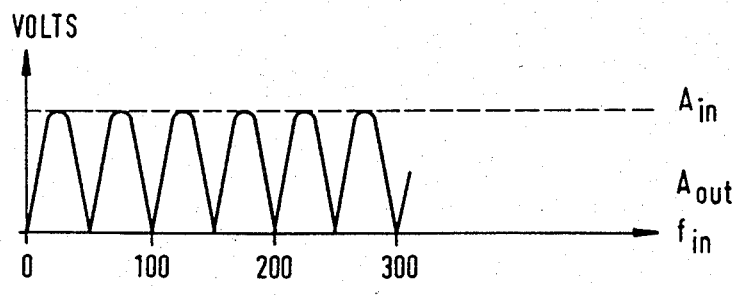
FIG. 4 shows a transfer function for the entire filter assembly.

One essential feature of the invention is shown in FIG. 3; the output signal (discrete time signal) of an aliasing sampling circuit is filtered by an analog filter (filter 10 in FIG. 1) which removes frequencies near 0 Hz and 50 Hz; removal of 0 Hz is particularly important, the share of 50 Hz is according to formula (3) very small (non-ideality of summing). If the amplitude of an aliased output signal is now studied as a function of f in (FIG. 4), it will be noted that the desired filtering of mains harmonics has been accomplished. It is also typical that if the signal posesses frequency components above 50 Hz, these will be down converted, thus destroying the waveform information contents.

Another advantage of the present solution is that it functions just as well at other than 50 Hz mains frequencies and that minor variations in mains frequencies do not disturb the process. Since the frequency information obtained from the original signal as a result of a filter assembly of the invention diminishes due to said aliasing of frequencies, the solution is best applied when the essential quantity to be determined is the amplitude or intensity of a signal which is often the case in the analysis of bioelectrical signals.

Instead of an analog multiplexer of FIG. 1, the discrete time sampling and summing can be effected by means of other analog switches or by a so-called commutative filter.

The invention is not limited to the described embodiment but a plurality of modifications can be made within the scope of the appended claims.

I claim:

1. A filter assembly for eliminating mains disturbances from an electric signal, especially a noise type of bioelectric signal, for analyzing amplitude, power or other intensity related parameter of the signal, comprising in combination:

sample and hold circuit means responsive to said electric signal for providing analogous discrete time samples from said electric signal by employing doubled mains frequency as the sampling frequency;

summing means responsive to said sample and hold circuit means for providing signals $Y_n = \tfrac{1}{2}(X_n + X_{n-1})$, wherein $X_n$ is a number n sample, from successive analogous samples for filtering away the mains frequency and its odd harmonic frequencies; and analog high pass filter means responsive to said summing means for processing said signals $Y_n$ for filtering away the even harmonic frequencies of mains frequency downmixed by the sampling.

2. The invention according to claim 1 wherein said sample and hold circuit means comprises an analog multiplexer for receiving said electric signal and having at least a pair of output channels, a dual monostable multivibrator responsive to the mains frequency for supplying the mains frequency to said analog multiplexer to select the output channel thereof and supplying doubled mains frequency to said analog multiplexer to provide said analogous discrete time samples from said electric signal, and hold circuits responsive to said output channels for summing the successive analogous samples.

* * * * *